Dec. 18, 1934.   E. D. DOYLE   1,984,920
METHOD AND APPARATUS FOR CONTROLLING ALTERNATING CURRENT GENERATING UNITS
Filed May 9, 1931   4 Sheets-Sheet 1

Inventor
Edgar D. Doyle
By Cornelius D. Ehret
his Attorney.

Dec. 18, 1934.   E. D. DOYLE   1,984,920
METHOD AND APPARATUS FOR CONTROLLING ALTERNATING CURRENT GENERATING UNITS
Filed May 9, 1931   4 Sheets—Sheet 2

Inventor
Edgar D. Doyle
By Cornelius D. Ehret
his Attorney.

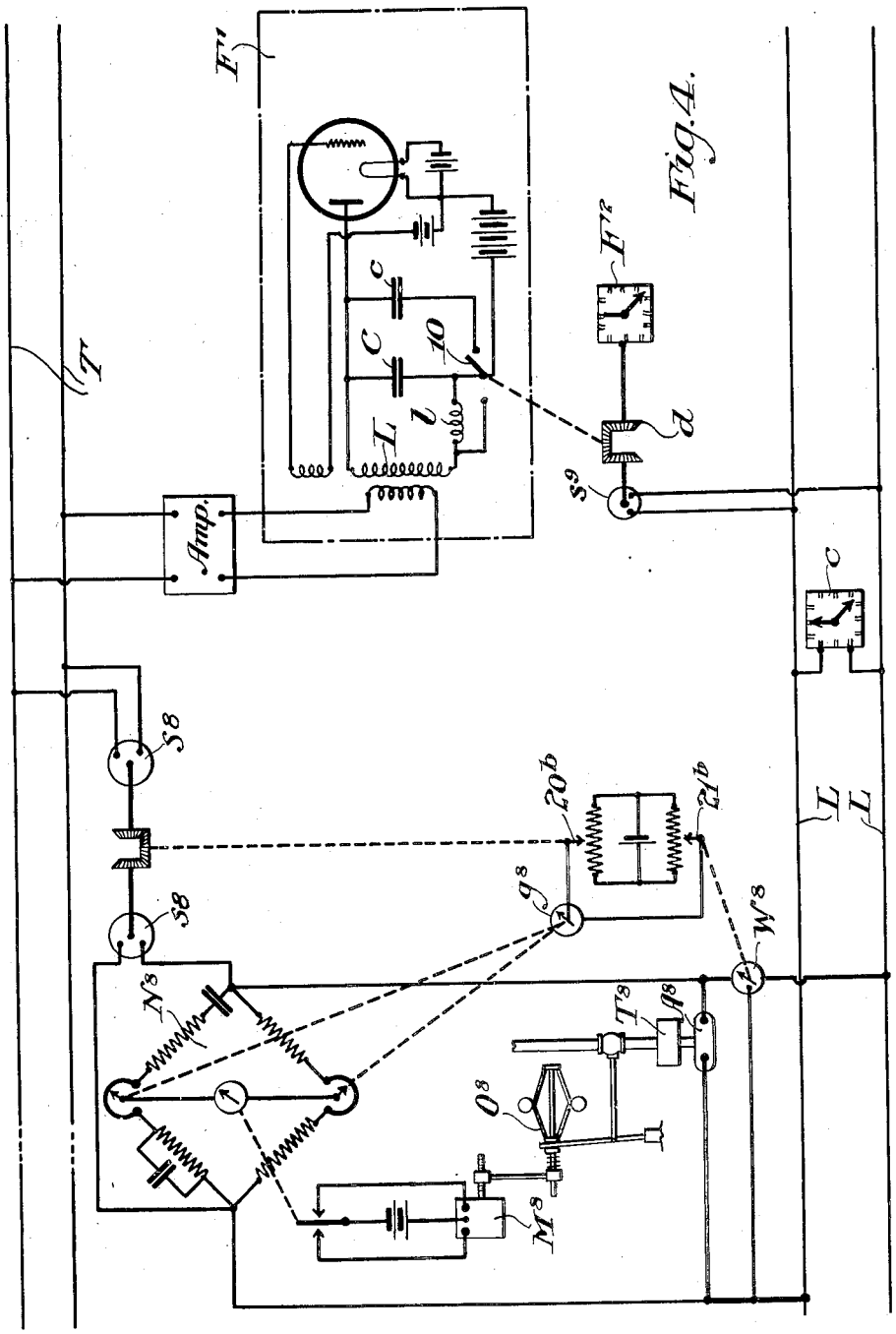

Patented Dec. 18, 1934

1,984,920

UNITED STATES PATENT OFFICE 1,984,920

METHOD AND APPARATUS FOR CONTROLLING ALTERNATING CURRENT GENERATING UNITS

Edgar D. Doyle, Philadelphia, Pa., assignor to Leeds & Northrup Company, Philadelphia, Pa., a corporation of Pennsylvania Application May 9, 1931, Serial No. 536,160

15 Claims. (Cl. 290—4)

My invention relates particularly to the control of the frequency and load of alternators supplying current to the same network.

In accordance with my invention, the frequency and specifically the integrated frequency, of alternators at the same or different stations, is compared with a common frequency standard which may be remote from all stations or located at one of them, to establish or maintain desired distribution of load between the alternators.

More specifically, and in accordance with one modification of my invention, the frequency of the common standard is controlled or adjusted to maintain correspondence between the time indication of synchronous clocks driven from the network, and a precise time standard.

My invention also resides in the methods and systems hereinafter described and claimed.

For an understanding of my invention and for illustration of some of the various forms it may take, reference is to be had to the accompanying drawings in which:

Figs. 2 to 4 illustrate further modifications of the invention for controlling the frequency and load of individual machines.

The systems shown in Figs. 1 to 4 correspond with the systems shown in Figs. 2 to 5 of co-pending Doyle and Heath application, Serial No. 526,873. The modifications herein specifically claimed are my sole invention.

Figure 1:
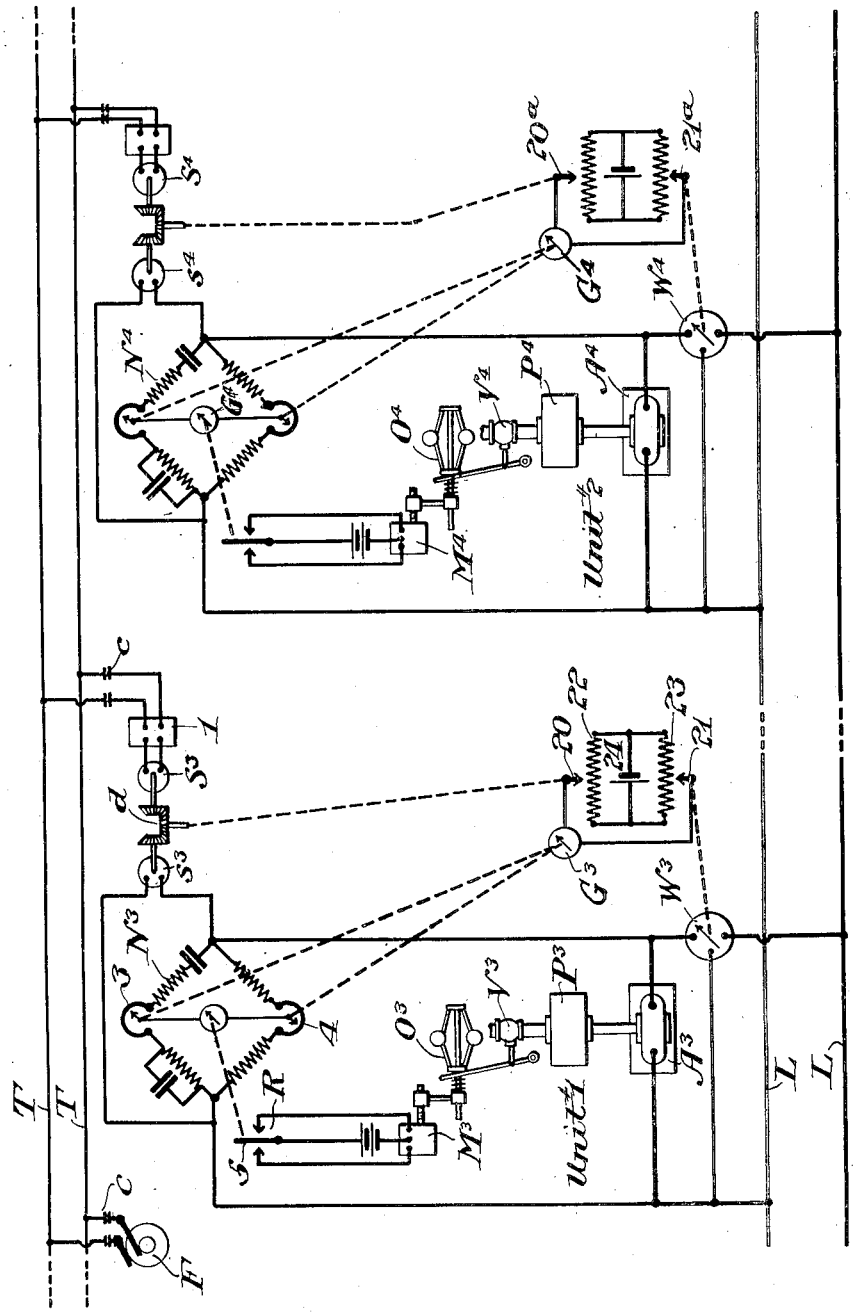
Fig. 1 illustrates diagrammatically a system for controlling the frequency of, and distribution of load between several alternators.

Referring to Fig. 1, generating unit #1 comprises an alternator A3 driven from a prime mover P3, as a steam turbine, the alternator supplying current to the distributing lines L and L. The network N3, which specifically is an alternating current Wheatstone bridge, normally controls the input to the prime mover P3 to maintain the instantaneous frequency substantially constant. Briefly, when the frequency departs from the value at which the bridge is balanced, current flows through the galvanometer G3 to move the contact 5 of the reversing switch R in a sense depending upon the sense of unbalance, to effect energization of the pilot motor M3 which changes the setting of governor O3 in the proper sense to restore the frequency to normal. This portion of the system, is not per se, my invention, but is described and claimed in Wunsch Patent 1,751,539. With the control thus far described, the instantaneous frequency is held within narrow limits, but after lapse of a substantial period of time, the integrated difference between the actual frequency and the desired frequency becomes undesirably large. To correct for the accumulated or integrated error, the setting of the bridge may be slightly modified in any one of several ways to vary the frequency at which it is balanced, for example, as indicated, the setting of the slide wires 3 and 4 of the bridge, may be varied by movement of the differential gearing $d$ between the synchronous motor $s3$ connected to the distribution line L, L, and a constant, or standard speed motor S3. The system thus far and broadly described is claimed in co-pending Heath application Serial No. 333,330, filed January 18, 1929.

Heretofore, and as explained in the aforesaid joint application Serial No. 526,878, the integrated frequency standards of different stations were unrelated and were usually clock-trains, with the result that the control systems of the individual stations were not working together and the lack of exact correspondence of the different standards affected the load distribution between stations feeding into the same network, or otherwise made it impractical for them to feed a common network.

In accordance with the invention broadly claimed in the joint application aforesaid, this difficulty is overcome by utilizing synchronous motors as standards at the several stations, or for the individual machines. These motors are supplied with current from a common source of standard frequency, so that at the different stations the motors serve as secondary standards of identical speed characteristics, or in effect there is a common standard for all stations and generating units thereof.

The primary standard F may be for example, a thermionic tube oscillator, multi-vibrator or the like, whose frequency is held constant, as by a quartz crystal held at constant temperature. The frequency of the primary source which may be located at one of the stations, or remote from all of them as at a laboratory equipped with apparatus and personnel capable of precision measurements, may be checked against star-time, to serve as an absolute or precise standard for all the stations of a network, or in fact for stations of different networks, and the frequency of the secondary standards S regardless of their number, or how remotely distributed, will be exactly the same as that of the primary standard F.

The standard frequency current may be transmitted to the different stations in any desired known manner; for example, it may be the modulation frequency of a carrier wave transmitted either through the ether or by wires. As there are usually wires between the stations for communicating purposes, as telephone wires, it is convenient to impress the standard frequency current upon these conductors. For example, in Fig. 1, the primary standard F is connected to the telephone wires T connecting different stations. As the standard frequency current is normally feeble in amplitude and incapable of directly operating a synchronous motor, there is interposed between each secondary standard, as S3, S4, and the telephone line T an amplifier 1 of any desired type, for example, a multi-stage thermionic amplifier, which is preceded by a rectifier with or without preceding high frequency amplifiers, as necessary or desirable, if the standard frequency is the modulation frequency of a carrier wave. The use of the telephone lines for transmission of standard frequency current need not interfere with their use for communication or other purposes. Separation of the currents may be effected at their points of utilization in any of the known ways, for example, the condensers c in the standard frequency feeds to and from line T may be of small value to offer high impedance to low frequency currents, though readily permitting the passage of high frequency carrier energy.

Any number of units similar to unit 1 may be controlled from the line T, whether in the same station or any distant station, and regardless of their distance from the standard frequency source F, the standard of comparison at each station is exactly the same as that of all of the other stations. A single secondary standard may be utilized in the control of more than one unit of a station, by connecting the differential gearing to the slide wire contacts of several networks.

Insofar as certain aspects of my invention are concerned, the movable contact 5 of the reversing switch R may be directly operated from the differential gear d, and the instantaneous frequency control network N, omitted. However, the arrangement shown is preferred.

The standard frequency need not be the same as the generated frequency. It is only necessary that the differential members of the synchronous motors S3, s3 and S4, s4, rotate at the same speed when the generated frequency is of the proper or desired magnitude.

The setting of the slide wires of the balanced network N3, is determined by a galvanometer G3 or equivalent, connected between the movable contacts 20, 21 moved respectively by the differential gearing d and the wattmeter W. In the particular example shown, the contacts 20 and 21 are movable along potentiometer resistances 22 and 23, connected across a battery 24. So long as the difference of potential between the contacts is unchanged, the setting of the slide wires 3 and 4 remains fixed. Upon change of either the output of the machine or movement of the differential gearing, galvanometer G3 deflects to change the slide wire setting of the controlling system. The governor bias is changed accordingly, to establish a predetermined operation of the unit under the changed conditions. The sense and extent of deflection of galvanometer G3 will depend upon the sense and extent of difference between the positions of the two contacts 20 and 21. The galvanometer deflection is zero for all positions of either contact if the other contact is at the same time in corresponding positions; and either contact may be of higher or lower potential than the other depending upon their relative positions. The electrical and mechanical connections are preferably such that for either low integrated system frequency or light load, the setting of slide wires 3, 4 will be changed to increase the instantaneous frequency. However, for a given load, the slide wire setting may vary either way depending upon the magnitude of the integrated frequency difference and conversely, for a given integrated frequency difference including zero difference, the slide wire setting may be changed in either direction depending upon the output of the alternator.

Unit 2 is or may be the same as unit 1, and the corresponding elements are identified by similar reference characters of higher index. If desired the relation between the extents of movement of contact 21a and 20a by the integrated frequency difference and load effects may be smaller or greater than the same relation between corresponding elements of unit 1 to redistribute the load for change in total load. Each of the units, which may be in the same or different stations, is or may be provided with a secondary frequency standard, as S3 and S4, driven from the same source of constant frequency, to insure that the distribution of load between the machines established or predetermined by their control apparatus will not be affected by any dissimilarity between the frequency standards, as was the case when the individual stations used clock-trains for standards.

Insofar as certain aspects of the invention are concerned, galvanometer G3 may operate contact 5 of the reversing switch with omission of network N3.

While constancy of the standard frequency is generally to be desired, it is of greater importance that the standard frequency is common to all stations as the proper relative settings of the contacts 20, and 20a are maintained. With different frequency standards at the different stations even though of high constancy, the contact settings would drift from the proper values and upset the desired load distribution between the stations.

Figure 2:
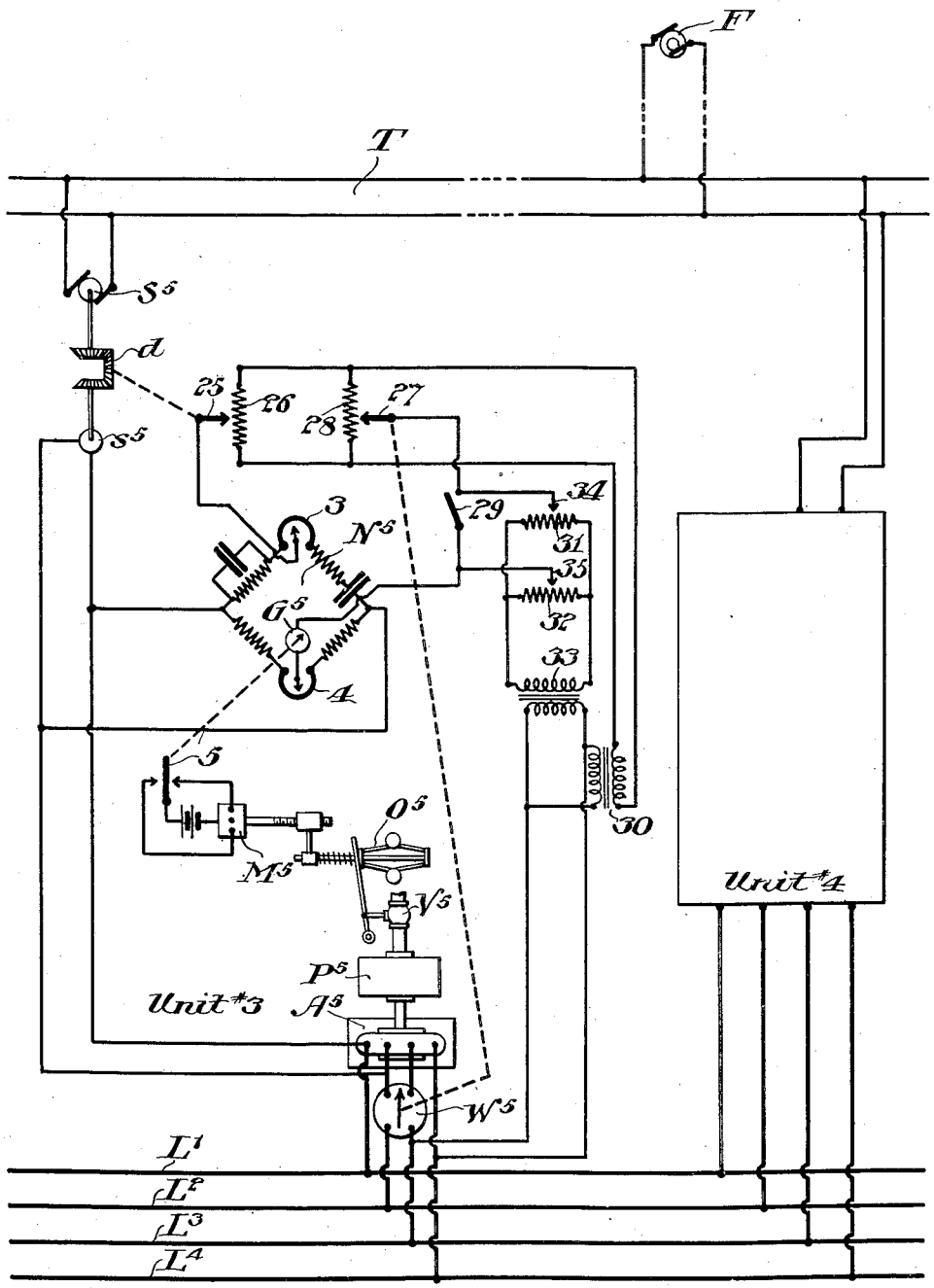

In the system shown in Fig. 2, which is generally similar to that of Fig. 1, the integrated frequency difference and the load of the individual machines are correlated without employing a second galvanometer, such as galvanometer G3, of unit 1. Briefly, instead of shifting the position of the slide wire contacts by a second galvanometer, there is introduced in series in the conjugate arm of the bridge including the galvanometer controlling the position of control contact 5, the difference between two electro-motive-forces whose magnitudes are representative respectively of the integrated frequency difference and the alternator load. In the system specifically illustrated, the differential gearing d changes the position of contact 25 along an impedance or resistance 26, while the watt-meter W5 shifts the position of contact 27 along resistance 28. The voltage across both resistances which are in shunt is supplied from the secondary of a transformer 30 whose primary is connected across phase L3, L4. The balanced network N5 is connected across another phase, L1, L2. With the switch 29 closed, the galvanometer G5 is in series with the two resistances, 26, 28 (which are in shunt to each other) in the conjugate conductor. The galvanometer G5 has zero deflection when the load and instantaneous frequency are normal and the integrated frequency difference is zero, or when the unbalanced voltage of the bridge is equal and opposite to the resultant of the voltages representing load and integrated frequency difference. For deflection of the galvanometer in one sense or the other, the setting of the governor is modified in accordance with the joint effects of instantaneous frequency, individual load, and integrated frequency difference.

With the switch 29 open, there is additionally included in series in the galvanometer arm of the bridge the two resistances 31, 32 which are connected in parallel across the secondary of a transformer 33, whose primary is also connected to phase L3—L4. The setting of the contacts 34, 35 of these resistances may be changed manually, to permit adjustment of the biasing effect of load upon the controller. Particularly when adjustable resistances 34 and/or 35 are utilized, the slide wire contacts 3, 4 may be fixed, or non-adjustable. One or more other controlled units, as unit #4, may feed current to the same network.

Figure 3:
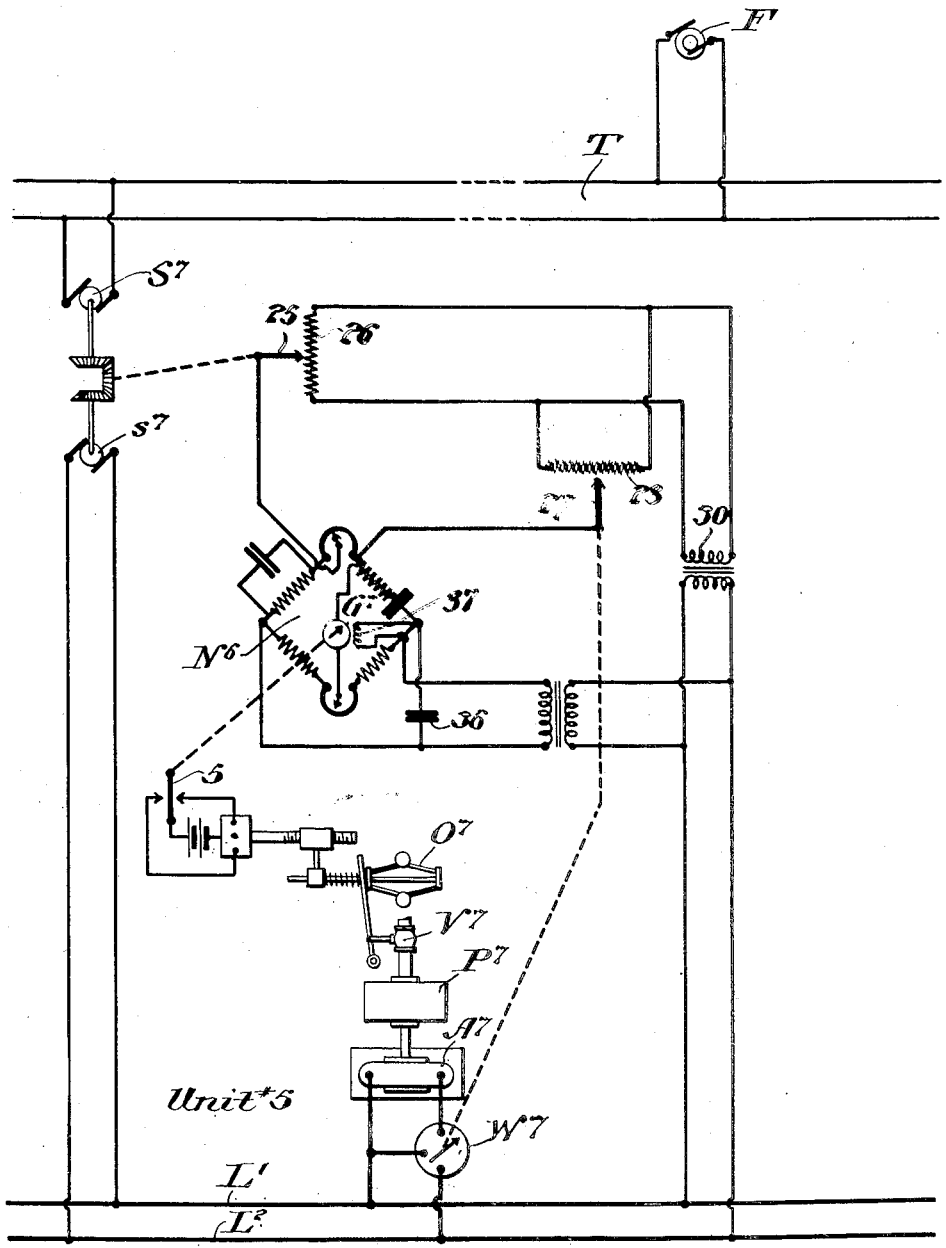

The system of Fig. 3 is similar to that of Fig. 2 except that all the control potentials are obtained from a single phase, which may be one phase of a poly-phase system. In the arrangement specifically illustrated, the proper phase-relation between the potentials is established by a filter network comprising a condenser 36 and inductance 37, which may be in whole or in part the field winding of the galvanometer, which shifts the phase of the voltage applied to the network N6 through approximately 90 electrical degrees. The same result could be obtained, by shifting the phase of the E. M. F.'s introduced into the conjugate arm of the bridge. The operation is the same as the operation of the system of Fig. 2 and separate description thereof is unnecessary.

In the preceding modifications, the integrated speed of the alternators is a function of load or system demand and consequently synchronous clocks connected to the power system do not continuously indicate true time. In the modification shown in Fig. 4, upon departure of system time from true time, the frequency of the source supplying current to the control line T for driving the secondary standard S3, S4 is varied to maintain correspondence of system time with true time.

System time is compared, preferably automatically and continuously with a true time standard F2 of any desired character, as a precision chronometer or an accurately calibrated and controlled crystal oscillator. A differential $d$ between the true time standard and a synchronous motor energized by current of system frequency, responds to the deviation of system time from true time to change the frequency of the source F1 of alternating control current for the secondary standards S8—S8, etc.

In the system specifically illustrated, when the system time corresponds with true time, the switch member 10 is in the position shown. When the system time becomes slow compared with true time, the differential $d$ between the precise standard F2 and the synchronous motor S8 moves switch member 10 to the left, short-circuiting inductance 1 to increase the resonant frequency of the oscillator circuit L, 1, C and hence the frequency of the control current transmitted by lines T. Conversely, when the system time is fast compared with true time, the differential $d$ moves switch member 10 to the right to include the condenser c in shunt to condenser C of the tuned oscillator circuit L, 1, C to decrease the resonant frequency of the circuit and consequently, the frequency of the control current transmitted by lines T.

Change in frequency of source F1 changes the speed of the secondary standards to modify the settings of contacts 20, 20a, 20b, 25, etc., associated with the control systems of the individual alternators, to change the alternator speed in proper sense to reduce the difference between system time, as indicated by synchronous clock C for example, and true time, as indicated by the precision clock F2, to obtain correspondence of true time and system time.

The controlling apparatus in all modifications such as the mechanisms for operating the reversing switches R or shifting the slide wires of the bridges is preferably generally similar to that disclosed in the aforesaid Heath application and Wunsch patent, though other forms may be utilized without departing from the spirit of my invention. As disclosed in the Heath application, instead of shifting the slide wire contacts the position of the control contact 5 may be changed to modify the control action. In both instances, the network, control contacts, galvanometer etc., comprise an electro-mechanical system which is balanced or in equilibrium for certain frequency conditions.

In all figures, the same reference characters have been applied to corresponding elements with the indexes changed for the different generating units and their control systems.

What I claim is:

1. In a system comprising two or more alternating current generating units, the method of controlling the distribution of load between the units which comprises comparing the frequency of the individual units with the frequency of a common frequency standard, producing effects representative of the differences between the standard frequency and the frequencies of their generated current, producing effects representative of the loads of individual units, and controlling the power input to each of said units jointly in accordance with the magnitude of the effect of its individual load and the magnitude of the frequency-difference effect to obtain a predetermined distribution of load between the units for each magnitude of difference between the frequencies of the standard and the generated current.

2. In a system comprising two or more different stations each including at least one alternating current generating unit, the method of controlling the distributions of load between the stations which comprises producing a standard frequency, transmitting the standard frequency to the different stations, continuously comparing the frequency of individual units at different stations with said standard frequency, and controlling the power inputs to individual units each jointly in accordance with its load and the integrated dfference between the standard frequency and the frequency of its generated current to obtain a predetermined distribution of load between the stations for each magnitude of difference between the integrated frequencies of the standard and the generated current.

3. In a system comprising two or more different stations each including at least one alternating current generating unit, the method of controlling the distribution of load between the stations which comprises continuously measuring the instantaneous frequency, controlling the power inputs to the individual units to maintain the instantaneous frequency substantially constant, producing a current of standard frequency, transmitting the standard frequency to the different stations, producing effects representative of the loads of individual units, and modifying the aforesaid control of individual units each jointly in accordance with its corresponding load effect and the integrated difference between said common standard frequency and the frequency of its generated current to obtain a predetermined distribution of load between the different stations for each magnitude of difference between the integrated frequencies of the standard and the generated current.

4. A control for an alternating current generating unit including an alternator and a prime mover therefor comprising a balanced system for varying the input energy to said prime mover, means for integrating the difference between the frequency of the generated current and a standard, and means responsive to change in output of said alternator, said integrating means and said responsive means jointly affecting the balance of said system.

5. A control for an alternating current generating unit including an alternator and a prime mover therefor comprising a system for varying the input energy to said prime mover, and balanced at a desired instantaneous frequency of the current generated by said alternator, means for integrating the difference between the frequency of the generated current and a standard, and means responsive to change in output of said alternator, said integrating means and said responsive means jointly determining the instantaneous frequency at which said system is balanced.

6. A control for an alternating current generating unit including an alternator and a prime mover therefor comprising an electrical network balanced at a desired instantaneous frequency of current generated by said alternator, a frequency standard, means for producing a voltage representative of the integrated difference between the frequency of current generated by said alternator and said frequency standard, and electrical means responsive to unbalance of said network and said voltage jointly for varying the input energy of said prime mover.

7. A control for an alternating current generating unit including an alternator and a prime mover therefor comprising a Wheatstone bridge balanced at a desired instantaneous frequency of current generated by said alternator, a deflecting instrument for varying the input energy of said prime mover responsive to current in a conjugate conductor of said bridge, a frequency standard, means for integrating the difference between the frequency of the generated current and said frequency standard, a source of voltage in said conjugate conductor, and mechanism operated by said integrating means for varying the effective magnitude of the voltage from said source.

8. A control for an alternating current generating unit including an alternator and a prime mover therefor comprising an alternating current Wheatstone bridge having one pair of conjugate points connected to said alternator, an instrument for varying the input energy to said prime mover in a path between the other pair of conjugate points of said bridge, a pair of shunt connected potentiometer resistances traversed by current from said alternator, connections from adjustable contacts of said potentiometer resistances to include them in series in said path, means responsive to changes in the output of said alternator for varying the position of one of said contacts, and means responsive to integrated departure of the frequency from a desired value for varying the position of the other of said contacts.

9. A control for an alternating current generating unit including an alternator and a prime mover therefor comprising a Wheatstone bridge network, an instrument for controlling the input energy of said prime mover included in a conjugate arm of said bridge, a potentiometer network including two shunt connected resistances in said conjugate arm, connections from said network to the same phase of said alternator, the connections to one of said networks including phase-shifting impedance, means responsive to the output of said alternator for shifting an adjustable contact along one of said resistances, and means responsive to integrated departure of the frequency from a desired value for varying the position of an adjustable contact along the other of said resistances.

10. A control for an alternating current generating unit including an alternator and a prime mover therefor comprising a Wheatstone bridge network connected to said alternator, an instrument for controlling the input energy of said prime mover included in a conjugate arm of said bridge, potentiometers included in said conjugate arm in series with said instrument, means responsive to changes in the output of the alternator for varying the setting of one of said potentiometers, means responsive to the integrated difference between the frequency and a desired value for varying the setting of another of said potentiometers, and means for changing the setting of another of said potentiometers to affect the balance of said network.

11. A system comprising two or more alternating current generating units each having a control system including a balanced network responsive to departure of frequency, means responsive to unbalance of said network for controlling the supply of energy to the unit, a second balanced network, means responsive to unbalance of said second network for changing the frequency at which said first network is balanced, and means responsive to departure of the unit's load from a predetermined magnitude for unbalancing said second network.

12. In a system comprising two or more alternators connected in parallel and individual prime movers therefor forming therewith individual generating units, the method of controlling the distribution of load between the units which comprises individually controlling the power inputs to said units to maintain the instantaneous frequency of the generated current substantially constant, and modifying the control of the individual units in accordance with the load of the unit and the integrated departure of frequency from a common frequency standard to obtain a predetermined distribution of load between the units for each magnitude of integrated departure of frequency from the common frequency standard.

13. In a system comprising two or more alternating current generating units supplying a common load, the method of control which comprises continuously comparing the frequency of the individual units with the frequency of a common frequency standard, and controlling the individual units in accordance with the integrated difference between the standard frequency and the frequency of their generated current.

14. In a system comprising two or more different generating stations each including at least one alternating current generating unit and supplying a common load, the method of control which comprises producing a current of standard frequency, transmitting the standard frequency to the different stations, continuously comparing the frequency of individual units at the different stations with said standard frequency, and controlling individual units of the different stations in accordance with the integrated difference between the standard frequency and the frequency of their generated current.

15. In a system comprising two or more different stations each including at least one alternating current generating unit and supplying a common load, the method of control which comprises continuously measuring the instantaneous frequency, controlling the individual units to maintain the instantaneous frequency substantially constant, producing a standard frequency, transmitting the standard frequency to the different stations, and modifying the control of the individual units in accordance with the integrated difference between said standard frequency and the frequency of their generated current.

EDGAR D. DOYLE.